(12) United States Patent
Beeck et al.

(10) Patent No.: US 6,276,692 B1
(45) Date of Patent: Aug. 21, 2001

(54) NON-CONTACT SEALING OF GAPS IN GAS TURBINES

(75) Inventors: Alexander Beeck, Küssaberg (DE); Wilhelm Endres, Remetschwil (CH); Konrad Vogeler, Küssaberg; Bernhard Weigand, Lauchringen, both of (DE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/349,963

(22) Filed: Jul. 9, 1999

(30) Foreign Application Priority Data

Jul. 14, 1998 (EP) ................................. 98810670

(51) Int. Cl.$^7$ ..................................... F01D 11/02
(52) U.S. Cl. ......................... 277/411; 277/412; 277/431
(58) Field of Search ................................. 277/303, 411, 277/412, 418, 419, 424, 304, 431, 432, 427; 415/173.5, 173.7, 174.5

(56) References Cited

U.S. PATENT DOCUMENTS

| | | | |
|---|---|---|---|
| 2,916,332 | * 12/1959 | Pavlecka | 384/109 |
| 3,645,544 | 2/1972 | Unsworth et al. | |
| 3,718,096 | * 2/1973 | Bloomfield et al. | 104/155 |
| 3,940,153 | * 2/1976 | Stocker | 277/412 |
| 4,335,886 | * 6/1982 | Frey et al. | 277/412 |
| 4,397,146 | * 8/1983 | Vigh | 60/39.75 |
| 4,513,975 | * 4/1985 | Hauser et al. | 277/412 |
| 4,682,933 | * 7/1987 | Wagner | 415/172 A |
| 4,836,148 | 6/1989 | Savage et al. | |
| 4,927,327 | * 5/1990 | Keller | 415/171.1 |
| 5,244,216 | * 9/1993 | Rhode | 277/412 |
| 5,251,441 | * 10/1993 | Eon et al. | 60/352 |
| 5,344,281 | * 9/1994 | Anokhin et al. | 415/71 |
| 5,639,095 | * 6/1997 | Rhode | 277/412 |

FOREIGN PATENT DOCUMENTS

| | | |
|---|---|---|
| 529914 | 12/1972 | (CH) . |
| 1930411 | 1/1970 | (DE) . |
| 3505491A1 | 8/1986 | (DE) . |
| 19619722A1 | 11/1997 | (DE) . |
| 855040 | 11/1960 | (GB) . |

* cited by examiner

Primary Examiner—Anthony Knight
Assistant Examiner—Alison K. Pickard
(74) Attorney, Agent, or Firm—Burns, Doane, Swecker & Mathis, L.L.P.

(57) ABSTRACT

The arrangements according to the invention and the methods according to the invention serve to seal a gap 20 against a primary fluid 10 by means of a secondary fluid 11 in a fluid-dynamic and non-contact manner, which primary fluid 10 flows over the gap 20. The secondary fluid 11 forms a preferably rotating vortex flow 13 in the gap in at least one or more sections along the gap. The flow of the secondary fluid 11 is preferably guided in a chamber 26, which is arranged in the gap 20. The chamber 26 is designed as a rotary chamber along the entire gap 20 or also as a local chamber 226 extending only locally along the gap. The secondary fluid 11 may be supplied via supply conduits 40, in which the gap 120 itself may be utilized for supplying secondary fluid 115 to the chamber 126. As further elements for the guidance of the vortex flow, guiding lips 50, undercuts of the chamber contour 351, and guiding elements 160 may be arranged in the gap. Furthermore, a mechanical seal 370 arranged in the gap on that side of the chamber which is remote from the primary flow may additionally seal the gap 320 mechanically. A typical embodiment of the invention is shown in FIG. 1.

A second arrangement according to the invention relates to a slalom chamber 690, which is arranged in S-shaped undulations along the gap 620.

32 Claims, 8 Drawing Sheets

NON-CONTACT SEALING OF GAPS IN GAS TURBINES

BACKGROUND OF THE INVENTION

1. Field of the Invention

The present invention relates to arrangements and methods for the non-contact sealing of gaps in fluid-flow machines, in particular in gas turbines.

2. Discussion of Background

The design of fluid-flow machines requires end-to-end mounting of components which are stationary and/or moving relative to one another. For functional reasons, one or more gaps, over which a primary-fluid flow flows in the flow duct of the fluid-flow machine, often remain between these components. Penetration of the primary fluid into these gaps is associated with this. Specifically in the hot-gas part of a gas turbine, penetration of the hot primary fluid into component gaps must be avoided at all costs on account of the high temperatures of the primary fluid, which are often even higher than the maximum permissible material temperatures. Hot primary fluid which nonetheless penetrates into the gaps, as a consequence of the heat exchange with the components adjacent to the gap, may therefore lead to inadmissibly high temperatures of these components. This in turn is the cause of component damage, in particular in the form of component cracks or an at least marked reduction in the service life of these components. In addition, gaps lead to flow leakages of the primary-fluid flow and thus to losses in the efficiency of gas turbines.

These gaps have hitherto been sealed against the primary fluid by means of mechanical seals such as, for example, seal plates and seal strips, bellows and spring-loaded seals or even by means of arrangements for fluid-dynamic sealing.

Mechanical seals, on account of their contacting operating principle, are subjected to abrasive wear and consequently have only a limited service life.

In the hitherto known arrangements for fluid-dynamic sealing, the aim is to block the gap by means of a unidirectional displacement flow. This displacement flow seals the gap against the primary fluid either by means of a continuous secondary-fluid flow discharged out of the gap into the primary-fluid flow, as described, for example, in CH 529 914, or by means of a secondary-fluid film covering the gap.

In the first case, a secondary fluid of increased backpressure is admitted to the gap at the gap opening remote from the primary flow. The higher pressure of the secondary fluid produces a unidirectional gap flow from the secondary-fluid-side reservoir into the primary flow.

In the second known method for the purpose of the fluid-dynamic sealing of a gap, a unidirectional secondary-fluid flow having a velocity component at right angles to the longitudinal direction of the gap is produced in the form of a secondary-fluid film covering the gap. As a result of the displacement effect of the secondary fluid, a fluid-mechanical separation of the primary fluid from a tertiary fluid located in the gap is thereby achieved. In this case, the tertiary fluid originates from a tertiary-fluid reservoir and flows into the gap via that opening of the gap which is remote from the primary flow. If this does not involve a gap between two components but rather a recess in one component, this recess has a closed component contour. There is therefore no connection to a reservoir of the tertiary fluid, provided there is no additional arrangement, such as, for example, a supply conduit. For the purpose of simplification, that volume of the recess which remains as dead volume of the recess on that side of the vortex flow which is remote from the primary flow is likewise designated below as tertiary-fluid-side gap portion.

However, both arrangements for the fluid-dynamic sealing require a comparatively high mass flow rate of the secondary fluid used for the sealing. In a use of secondary fluid branched off from the compressor region, which is a conventional use in practice, these methods also often have only limited effectiveness, in particular in the turbine inlet region. As a cause of this, for example a local build-up of the flow in front of the vanes of the inlet guide disk of the turbine may lead to a local increase in the static pressure of the primary-fluid flow. During a pressure loss of the primary flow in the combustion chamber, which loss is only slight as a rule, the local static pressure of the primary flow, when flowing over a gap, may be higher in the turbine inlet region than the pressure of the secondary fluid extracted directly in front of the combustion chamber and supplied to the turbine. As a result of this pressure gradient, a local inflow of the hot primary fluid occurs in at least sections of the gap.

Thermally or mechanically induced component expansions and the resulting changes in the geometric dimensions of the gaps as well as displacements of the components relative to one another in the longitudinal direction of the gap considerably increase the demands imposed on the seals used. Thermally induced changes in the component geometry occur in particular in the hot-gas part of a gas turbine. The result is frequent malfunctions of both the mechanical seals and the arrangements for the fluid-dynamic sealing. In addition, the service life of the mechanical seals is further reduced to a significant degree.

Described in Patent Specifications GB 855 040 and U.S. Pat. No. 3,645,544 are sealing arrangements in which, in order to seal a gap against a primary fluid, a secondary fluid is supplied into the gap in such a way that a vortex system forms in the gap. However, the sealing arrangements described can in each case be used only for gaps between two components where the components rotate relative to one another and the gaps in each case extend over the entire periphery.

SUMMARY OF THE INVENTION

Accordingly, one object of the invention is to provide novel arrangements and a method for the non-abrasive and efficient sealing of the gaps occurring in fluid-flow machines. In this case, the gaps may occur as component gaps between components which are stationary relative to one another or moving relative to one another, or may also be designed as gap-shaped recesses of a component. The arrangements and the method are also to be developed in particular from the point of view of a reliable use in the hot-gas part of a gas turbine with gap geometries changing during operation as a result of thermal and mechanical component expansions.

This object is achieved according to the invention in a first aspect in that the secondary fluid forms a vortex flow in the gap or directly adjacent to the gap in at least one or more sections along the gap. In the process, the vortex flow preferably forms over the entire gap width.

A reduced demand for secondary-fluid mass flow, which is required for the sealing of the gap, turns out to be a considerable advantage over the hitherto known fluid-dynamic methods. This is due to the fact that the fluid-mechanical separation of the primary-fluid flow from the tertiary fluid located in the tertiary-fluid-side gap portion is effected by means of a comparatively thin vortex layer of the secondary fluid. In this case, secondary fluid and tertiary fluid may in principle originate from the same reservoir, although suitable pressure ratios in the inflow to the gap have to be taken into account. The specific design of the vortex flow of the secondary fluid leads to every secondary-fluid particle flowing repeatedly over the gap and therefore leads to a multiple sealing effect. In the process, the secondary fluid of the vortex flow mixes only slightly with the primary fluid or the tertiary fluid.

A further considerable advantage of the vortex flow over the unidirectional sealing flows has been found in the inherent stability of the vortex. Even at small pressure differences between the secondary fluid and the primary fluid, the vortex flow turns out to be stable and therefore ensures the sealing effect.

With regard to inherent stability and simplicity of the flow guidance, it is found that it is especially advantageous to guide the secondary fluid in such a way that a vortex flow rotating about a rotary center or a rotary axis forms.

By means of a suitable configuration for supplying the secondary fluid into the primary-flow-side outlet region of the gap, this rotation of the vortex flow is produced by the primary-flow forces acting on the supply flow.

In a preferred embodiment of the invention, the flow is guided in a chamber arranged in the gap in the longitudinal or peripheral direction of the gap. If the gap is arranged at the periphery of a component configuration or a rotationally symmetrical machine, for example a gas turbine, the longitudinal direction of the gap is identical to the peripheral direction of the component configuration or the machine. Reference is expediently made below only to the longitudinal direction of the gap. Due to the chamber side walls, a secondary-fluid-flow vortex formation which is largely independent of the primary flow and is defined in its position is produced in the first embodiment of the invention. In this case, the chamber-forming voids in the component side walls may be of symmetrical or asymmetrical design with regard to the gap-forming components. A rotating vortex flow is preferably guided in a rotary chamber. In order to avoid wake zones in the rotary chamber, the chamber contour should be of a shape, preferably round or elliptical, such that it is adapted to the outer flow vectors of the vortex flow. If the rotary chamber is shaped symmetrically with regard to the component side walls, semicircular or semielliptical voids, as viewed in a cross section of the gap-forming components, are therefore obtained in each of the component contours adjacent to the gap.

The chamber may be designed as an endless chamber for sealing an endless gap at the periphery of a component configuration, in particular in rotationally symmetrical machines, or as a chamber having finite dimensions. A finitely dimensioned chamber in a finite gap, with regard to the gap length, may also extend beyond the start or the end of the gap. Likewise, it is also possible to arrange a local chamber in a finite gap or in an endless gap. In this case, the local chamber extends only over a section of the gap. A local chamber in an endless gap is used in particular when the sealing is only to be effected locally or when the aim is to locally intensify another arrangement or another method for sealing the gap. In a gas turbine, the intensification of conventional arrangements is appropriate for sealing in particular in the component gaps between the combustion chamber and the first turbine guide disk with a locally increased static pressure of the primary flow as a result of the build-up in front of the turbine guide vanes. To this end, local chambers are preferably arranged in the gap in the regions of locally increased static pressure of the primary flow.

In a further embodiment, the chamber may be subdivided into subchambers. This subdivision of the chamber into subchambers is preferably effected via a configuration of dividing walls. In turbomachines, these dividing walls are advantageously arranged radially. For each subchamber, the intensity of the vortex flow can therefore be varied, for example, by a variation in the secondary-fluid mass flow supplied to the subchamber.

In the case of gaps between a stationary and a moving component wall, it is of advantage to arrange guiding elements in the gap or the chamber. These guiding elements are preferably guiding webs inclined or curved in the depth direction of the gap. These guiding elements are fastened to one component wall, preferably to the moving component wall. As a result of the relative movement of the side walls, the secondary fluid introduced is carried along by the guiding elements in the direction of rotation of the moving wall. The shearing and centrifugal forces acting on the secondary fluid lead to a vortex formation of the flow of the secondary fluid.

However, such guiding elements are advantageously also arranged in gaps between components which are stationary relative to one another.

The vortex flow in the chamber arranged in the gap is subdivided into regions in which the vortex flow is guided by the wall contour and flow regions without guidance of the vortex flow. Flow regions without guidance occur where flow takes place over the gap. False streams of the vortex flow during the flow over the gap may form as a result of pressure changes in the primary fluid or the tertiary fluid as well as as a result of thermally or mechanically induced geometric changes in the gap, in particular displacements of the components relative to one another. These false streams in turn may lead to a partial or even a complete collapse of the vortex flow of the secondary fluid. As a consequence, partial penetration of primary fluid into the chamber occurs and, in the extreme case, the sealing effect of the vortex flow is even completely eliminated.

In order to reduce the flow region without wall-side guidance, one or both gap-forming side walls, in a preferred embodiment of the chamber, each have a guiding lip in the contour of the respective side wall. In accordance with their function of guiding the flow, it is of advantage to arrange these guiding lips in the respective vortex outlet region of the chamber as viewed in the direction of rotation of the produced vortex flow of the secondary fluid. In this case, the lips jut out into the gap. In a preferred embodiment, that contour of the guiding lip which is on the inside of the chamber is designed in such a way that, in continuation of the chamber-forming side wall contour, it is adapted to the outer flow vectors of the vortex flow.

A divergence, forming as a false stream, of the vortex flow in the regions of the chamber which are not guided by the wall may additionally be taken into account via at least one undercut in the chamber contour. This undercut of the chamber contour is preferably designed in such a way that that contour of the chamber-forming side wall which is viewed in each case in the vortex inlet region in the direction of rotation of the vortex produced is at a greater distance from the center of the vortex flow than in the outlet region of the chamber-forming side wall positioned upstream in the direction of rotation of the vortex.

By an especially preferred combination of a guiding lip with an undercut of the component arranged downstream in the direction of rotation of the vortex, the vortex flow is subjected to an effect similar to a ski-jump when flowing over the gap.

The secondary fluid is preferably supplied via supply conduits, which lead into the gap or the chamber. The configuration of the supply conduits is advantageously to be selected in such a way that the secondary fluid is introduced into the chamber, the gap or the immediate vicinity of the gap in such a way as to assist the vortex. The positioning of the supply conduits at the periphery and in the longitudinal direction of the chamber or of the gap should in this case be selected as a function of the geometric dimensions of the chamber or of the gap, as a function of the cross sections of the supply conduits, and as a function of the vortex intensity to be achieved. The configuration of the supply conduits is advantageously selected in such a way that, via the distributed supply of the secondary fluid, the respective mass-flow and impulse input of the secondary fluid supplied maintains the vortex flow along the gap to be sealed.

As a preferred configuration of the supply conduits at the periphery of the chamber, these supply conduits are arranged in one or two rows. In the case of a double-row configuration, it is advantageous to position the supply conduits in such a way that the supply conduits in each case come to lie in pairs in a cross-sectional plane of the chamber.

It is appropriate and of advantage to select the direction of the supply of the secondary fluid in the regions of the gap which are to be sealed basically in such a way as to assist the vortex. The secondary fluid is preferably supplied into the marginal regions of the vortex flow with an injection direction which is approximately tangential relative to the vortex flow. This leads to optimum re-energizing of the vortex flow.

If the secondary fluid is supplied perpendicularly to the center plane of the gap, a local and stationary vortex forms. If the secondary fluid is supplied at an angle deviating from the vertical to the center plane of the gap as seen in plan view, the vortex flow is given an additional vectorial velocity component in the longitudinal direction of the gap. The vortex flow is therefore propagated along the gap. The greater spatial extent, compared with the vertical supply, of the vortex flow in the longitudinal direction of the gap may be mentioned as an advantage of this setting.

If the static pressure of the primary flow changes along the gap, it is of advantage to arrange at least one supply conduit in the cross-sectional plane of the highest static pressure of the primary flow. On the one hand, the vortex flow is thus re-energized in the plane of the highest primary-fluid-side flow resistance; on the other hand, the secondary fluid supplied follows the pressure gradient of the primary flow. This assists the longitudinal movement of the vortex flow inside the gap.

The cross sections of the supply conduits, in principle, may be selected as desired. Supply conduits of round shape may be made in a simple manner from the point of view of production, whereas supply conduits of slitlike design permit a more specific supply of the secondary fluid into the vortex flow. In this case, the supply conduits leading into a chamber or a gap need not be designed to be the same as one another.

In particular in the case of gaps between a stationary and a moving component, it is of advantage to supply the secondary fluid to the chamber through the gap itself. In this case, the feeding is effected, for example, from a reservoir, which is arranged at the free gap end remote from the primary flow. In rotary machines, cavities arranged in the machine interior serve as such reservoirs, which, specifically in gas turbines, are in turn fed with fluid from the compressor region. On the one hand, this supply of the secondary fluid through the gap itself can generally be realized with very little outlay in terms of design and production. On the other hand, this results in the advantage that the entire gap up to the chamber is filled by secondary fluid and therefore penetration of primary fluid into the gap is additionally made more difficult. Furthermore, cooling of the components adjacent to the gap occurs, in particular in the hot-gas part of a gas turbine, when using secondary fluid extracted from the compressor region.

If the secondary fluid is supplied to the chamber through the gap itself, it is especially advantageous to additionally arrange guiding elements in the gap or the chamber. In an embodiment of simple design, it is thereby possible to initiate the vortex flow of the secondary fluid.

In particular in the case of long gaps or endless gaps, it is expedient to arrange at least one vortex diffuser in the chamber. This vortex diffuser leads to a specific and locally defined collapse of the vortex flow and to an outflow of the fluid of the vortex flow from the chamber into the primary flow. This is therefore expedient in particular in order to also renew the fluid in the center of the vortex flow.

On the whole, it is appropriate and at least sufficient if secondary fluid which has been used beforehand for the cooling of components in at least closed cooling conduits is used in the turbine region of a gas turbine.

In principle, for every configuration of the vortex flow, there will be an interaction between the secondary fluid and the primary fluid on the one hand and between the secondary fluid and the tertiary fluid, if present, on the other hand. The viscous shearing forces acting on the fluid particles in the transition regions of the fluid flows, in addition to a dissipative impulse loss, lead to a mutual fluid exchange. This interaction may be specifically influenced as a function of the constructional configuration of the chamber in the gap and as a function of the geometric gap openings on the primary-flow side and the tertiary-flow side and also as a function of the configuration of the supply conduits. The dependent parameters are to be appropriately selected in such a way that the vortex-forming fluid is drawn off successively into the primary flow. Equally, a continuous supply of new secondary fluid into the vortex flow is required. In addition to the supply of secondary fluid via the supply conduits, fluid may also be drawn off from the tertiary-fluid-side reservoir into the vortex flow.

In addition to the vortex flow, conventional, mechanical sealing elements may be arranged in the gap. Thus, for example for the additional, mechanical sealing of a component gap in a gas turbine, a seal strip inserted in grooves may be attached. In this case, the components may be stationary or even moving relative to one another. These mechanical seal elements are preferably arranged on that side of the vortex flow which is remote from the primary-fluid flow. Supply of the secondary fluid through the gap itself may also be effected in combination with a seal strip. For this purpose, in a preferred embodiment, openings may be provided in the seal strip in a simple manner in terms of design. These openings are preferably set at suitable angles of incidence relative to the gap center plane, so that the secondary fluid flowing through the sealing strip already has an initial swirl when entering the chamber. The angles of incidence and the geometric shapes as well as the repetitiveness of the openings are to be advantageously selected from the point of view of maintaining the vortex flow.

A further advantage of the rotating vortex flow, for use in sealing a gap, in particular in the hot-gas part of a gas turbine, compared with previous arrangements and methods lies in the temperature profile of the vortex flow, this temperature profile appearing as a result of the rotation. If the fluid composition of the vortex flow is homogeneous, the hot fluid particles are concentrated in the center of the vortex flow, whereas colder fluid particles are centrifuged into the outer regions of the vortex flow. This physical effect, compared with previous arrangements and methods for the fluid-dynamic sealing of the gap, directly results in two advantages of the vortex flow. On the one hand, this centrifuge effect, due to the accumulation of colder fluid in the outer regions of the vortex, and with the outer velocity vectors of the vortex flow being adjacent to the gap-forming components, leads to a heat exchange with the adjacent components. In the hot-gas part of a gas turbine, this generally leads to cooling of the components concerned. On the other hand, fluid of the hot primary flow which penetrates into the gap, at least at the side walls of the gap, and is caught by the vortex flow is displaced from the outer regions of the vortex flow into the vortex center. The resulting temperature at the component walls therefore corresponds at most to a resulting mixed temperature in accordance with the fluid portions of the vortex flow.

Small dimensions of the chamber or of the gap cross section enclosing the vortex flow have a positive effect on the vortex intensity as well as on the heat transfer. However, the resulting high velocities of the vortex flow lead at the same time to a high dissipative pressure loss of the flow. This in turn requires a configuration of the supply conduits at short distances apart along the gap or the chamber for the purpose of re-energizing the flow.

Compared with mechanical seals, the adaptability of the vortex flow in the event of geometric displacements of the gap-forming components relative to one another constitutes an essential advantage of the flow guidance according to the invention of the secondary fluid for the fluid-dynamic sealing of a gap. These displacements may occur as a consequence of mechanical or thermal component expansions during operation of a gas turbine. Small geometric dimensions of the chamber restrict the absolute adaptability.

The design of the flow conduit in the form of a slalom conduit constitutes a further arrangement according to the invention for the purpose of the flow guidance of the secondary fluid as displacement flow. In this case, the slalom conduit is preferably designed as a chamber having a configuration of successive S-shaped undulations of freely selectable radii along the gap between components which are stationary relative to one another. In the same way as in the case of the rotary chamber, it is advantageous to arrange further elements in the slalom conduit, such as, for example, guiding lips, undercuts, supply conduits and/or additional mechanical seals with and without openings. Likewise, the slalom conduit may be designed as an endless chamber or as a local chamber and may also be subdivided into subchambers by dividing walls.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
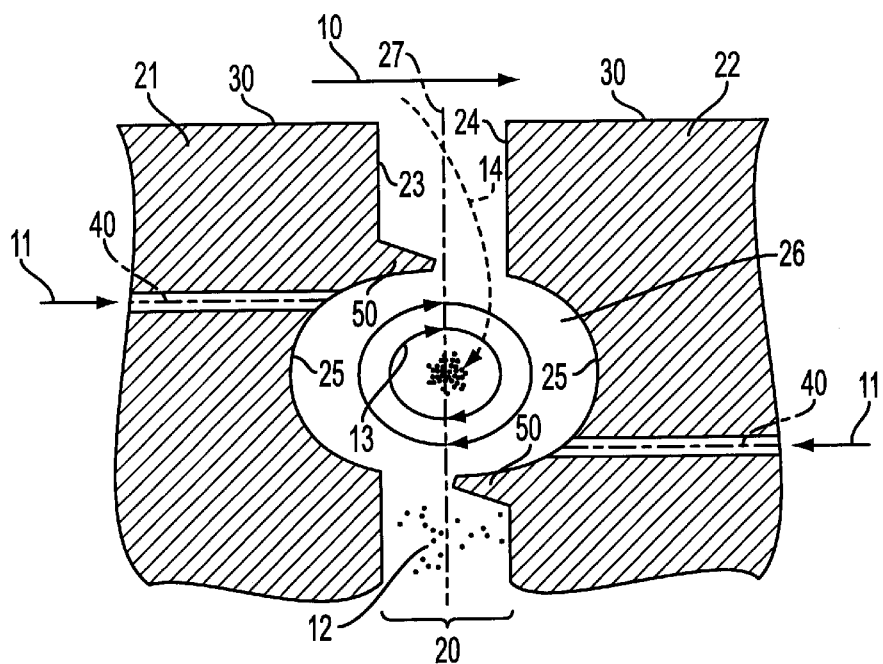
FIG. 1 a shows a section through two components, which form a gap, in a configuration with an arrangement according to the invention, shown in a cross section, for sealing the gap

Referring now to the drawings, wherein like reference numerals designate identical or corresponding parts throughout the several views, FIG. 1 shows a section through two components 21 and 22, between which a gap 20 remains, in a configuration with a sealing arrangement according to the invention. In this case, it makes no difference in principle whether the components 21 and 22 are stationary relative to one another or moving relative to one another.

Here, the side walls 23 and 24 of the gap 20 each have a semicircular void 25 in the contour of the components 21 and 22. In this embodiment, the voids are arranged in the gap 20 at a depth corresponding approximately to a width of the gap 20. The radius of the voids corresponds approximately to half the width of the gap 20. In the assembled component configuration, these voids form an elliptical chamber 26. In the arrangement shown, the wall contour of the chamber 26 is extended in each case via a guiding lip 50 jutting out into the gap 20. Here, these guiding lips 50 jut out into the gap 20 by up to about 40% of the width of the gap 20.

Figure 2:
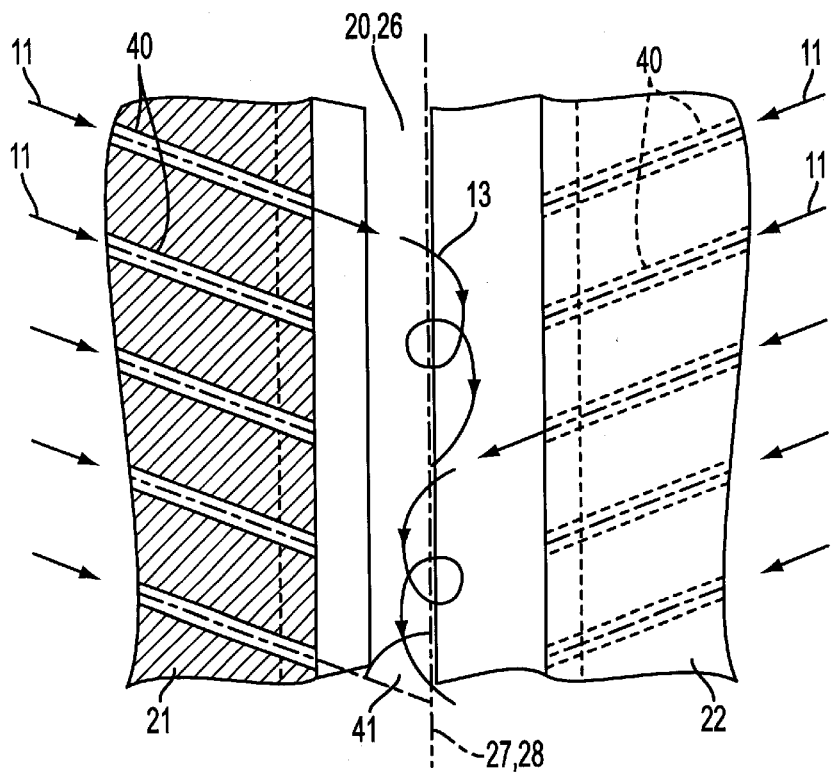
FIG. 2 shows a plan view of the gap from FIG. 1 with the arrangement according to the invention

In this embodiment, a supply conduit 40 is arranged in each of the components 21 and 22 in such a way that these supply conduits 40 lead into the chamber eccentrically and perpendicularly to the gap center plane 27 close to the respective guiding lip 50. In this case, the supply conduits 40 are arranged in such a way that the secondary fluid 11 is supplied into the outer regions of the chamber 26 approximately parallel to the chamber contour. The cross sections of the supply conduits 40 may be slitlike, elliptical or even round. The latter embodiment, from the point of view of production, can be realized by bores in a simple manner. The supply conduits 40 in this embodiment in each case lie in pairs in a cross-sectional plane of the chamber 26. FIG. 2 shows the configuration of the supply conduits 40 in the longitudinal direction of the gap 20 in a plan view. The supply conduits 40 lead into the chamber 26 at an angle of incidence 41 to the vertical 28 to the gap center plane 27.

As shown in FIG. 1, primary fluid 10 flows over the surface 30 of the component-part configuration. The gap 20 is filled with a tertiary fluid 12, which penetrates into the gap 20 through that free opening of the gap 20 which is remote from the primary flow 10. The secondary fluid 11 introduced into the chamber 26 via the supply conduits 40 forms a vortex flow 13. As a result of the guidance of the flow by the chamber wall, the vortex flow 13 rotates about the center axis of the chamber 26. A prerequisite for this is that the total pressure of the secondary fluid 11 is at least slightly above the static pressure of the primary fluid 10 and the total pressure of the tertiary fluid 12.

In the plan view according to FIG. 2, the velocity vector of the secondary fluid 11 supplied, as a result of the setting of the supply conduits 40 at the angle of incidence 41, has a component in the longitudinal direction of the gap 20. This velocity component leads to a forward movement of the vortex flow 13 in the longitudinal direction of the chamber 26.

According to the invention, the vortex flow 13 produced, as a result of the displacement effect of the vortex flow 13, leads to a separation of the primary fluid 10 from the tertiary fluid 12. Primary fluid 14 which nonetheless penetrates into the gap 20 is caught by the rotating vortex flow 13 and likewise set in rotation. With a homogeneous or approximately homogeneous composition of the fluids 10, 11, 12 and at higher temperatures of the primary fluid 10 compared with the secondary fluid 11, the temperature-induced differences in density of the fluids lead to a displacement of the hotter flow portions into the center of the rotating vortex flow 13. The penetrating primary flow 14 is therefore caught in the vortex flow 13 and does not penetrate further into the gap 20.

As a function of the pressures of the fluids 10, 11, 12, there is likewise a fluid exchange between the vortex flow 13 and the tertiary fluid 12 and also an outflow from the vortex flow 13 into the primary flow 10. This mutual interaction and mixing of the fluids 10, 11, 12 is also influenced in particular by the geometric design of the chamber 26. If a suitable geometric design of the chamber is selected, in particular of the flow guiding elements in the regions of the flow of the vortex flow 13 over the gap, there is only a slight mass flow loss of the vortex flow 13 to the primary flow 10 and virtually no fluid flow into the gap regions of the tertiary fluid 12. A specific outflow of fluid of the vortex flow 13 into the primary flow 10 is perfectly desirable in the process in order to renew the fluid of the vortex flow 13 by secondary fluid 11 which has just been supplied.

In addition to the fluid-dynamic sealing of the gap 20, a heat exchange takes place between the component walls 25 surrounding the vortex flow 13 and the flow vectors of the vortex flow 13 which are on the outside of the vortex and adjoin the component walls. This heat exchange, in particular in turbines, generally leads to the components 21, 22 which adjoin the vortex flow 13 being cooled in the regions of the vortex flow. The heat transfer and thus the cooling can be intensified by increasing the velocities of the vortex flow 13. Higher velocities, in turn, are obtained in the case of smaller geometric dimensions of the chamber 26 while the secondary-fluid mass flow 11 stays the same or if the secondary-fluid mass flow 11 is increased while the geometric dimensions of the chamber stay the same.

Figure 3:
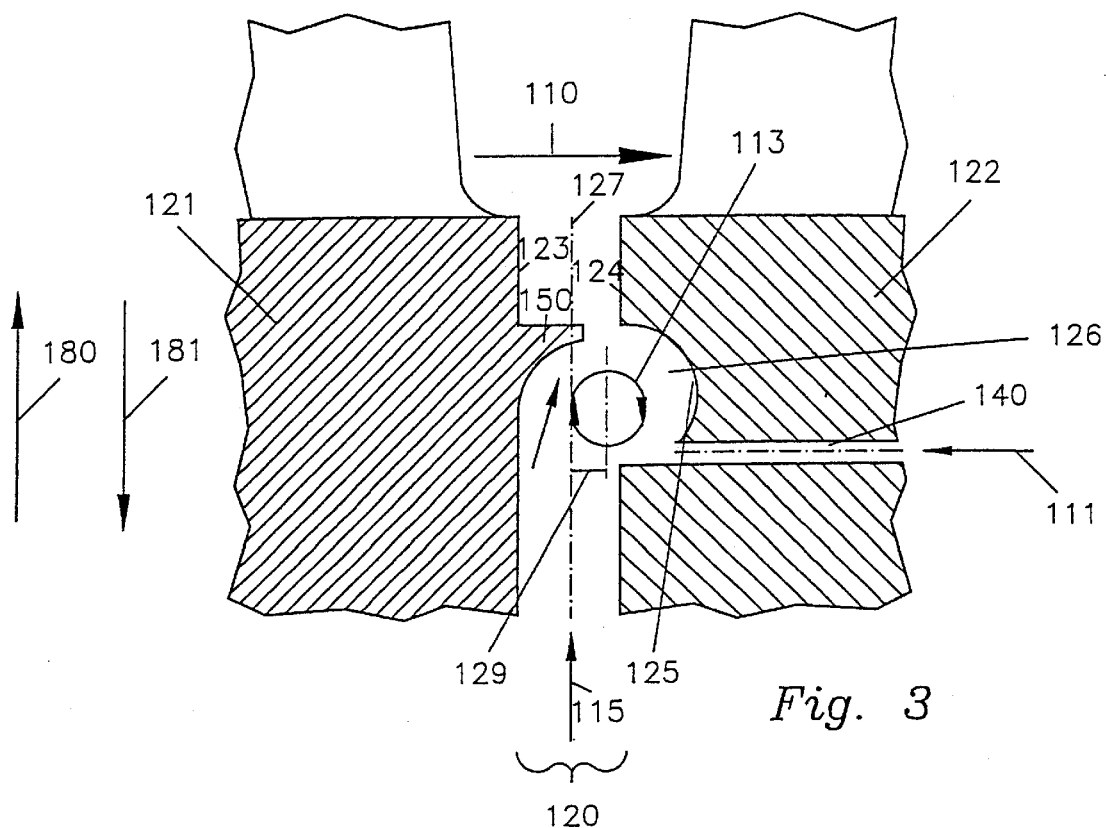
FIG. 3 shows a section through a further embodiment of the arrangement according to the invention for sealing a gap between a rotating and a Stationary vane row in a turbomachine

FIG. 3 shows a further embodiment of the sealing arrangement according to the invention, which is used in particular at gaps 120 between a moving side wall 121 and a stationary side wall 122. Here, the chamber 126 is designed in such a way that one of the two gap-forming components, preferably the stationary component 122, has a semicircular void 125 in the contour of the gap-forming component side wall 124. The second component, preferably the moving component 121, has only a clearly pronounced guiding lip 150 in the contour of the side wall 123. This guiding lip 150, relative to the chamber 126, is arranged on the primary-flow side and projects here into the gap 120 by up to about 70% of the width of the gap 120.

The secondary fluid 111 is supplied on the one side via a supply conduit 140, which is arranged in the stationary component 122 in the lower marginal region of the chamber 126 at the same aspect angles as in FIG. 1 in the injection direction perpendicular to the gap center plane 127. In addition, in the embodiment shown in FIG. 3, the secondary fluid 115 is supplied to the chamber 126 via the gap 120 itself.

The secondary fluid 115 flowing out of the gap 180 in the radial direction 120 or with negative orientation relative to the depth direction 181 of the gap undergoes a deflection of the flow in the transverse direction of the gap due to the guiding lip 150. Following the side wall contour 125 of the stationary component, the secondary fluid is again deflected in the positive depth direction 181 of the gap and is deflected further in the transverse direction of the gap again. In the last deflecting region, the forming vortex flow 113 is assisted in its deflection by the secondary fluid 111 supplied via the supply conduit 140 of the stationary component 122. The configuration, thus selected, of the supply conduit 140 in the stationary component 122 therefore prevents a backflow of the vortex flow 113 into the gap 120. A second guiding lip may consequently be omitted.

The forming vortex flow 113 seals the gap 120 with the same action as already described in connection with the first embodiment.

This embodiment proves to be of advantage especially in component configurations in which one of the two gap-forming components rotates about a common component axis. This is the case, for example, in turbomachines, in particular in gas turbines, between a rotor and a stator. As a result of the rotor-side wall friction of the secondary fluid 115 in the gap 120, the secondary fluid 115 is set in rotation. The centrifugal forces acting on the secondary fluid 115 in the process assist the outflow of the secondary fluid 115 in the radial gap direction 180 as supply flow to the chamber 126. This is of advantage in particular where there are only very small pressure differences between the secondary fluid 111, 115 and the primary fluid 110.

Figure 4:
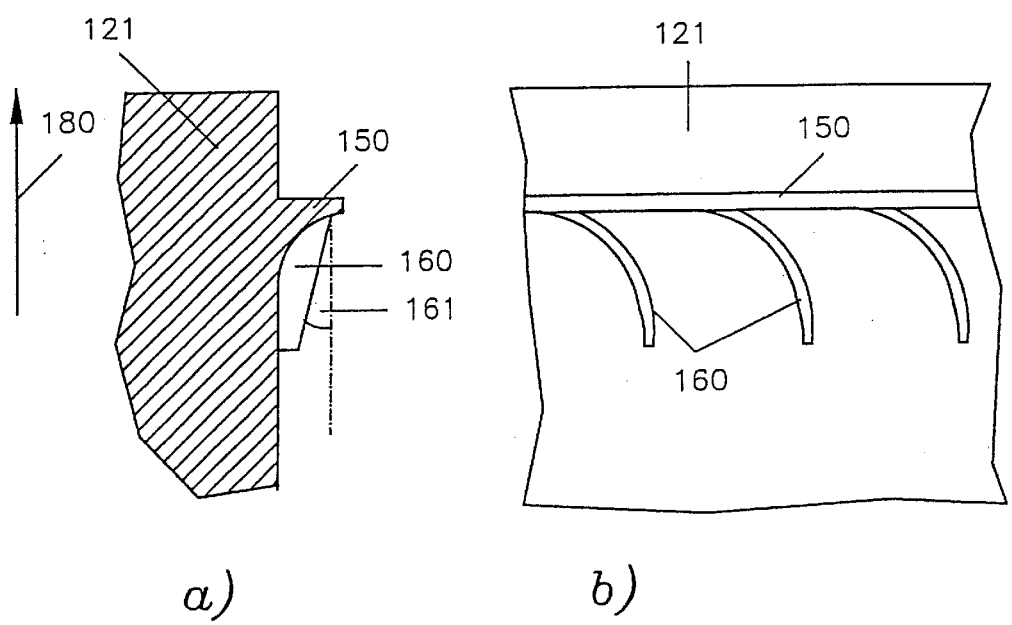
FIG. 4 shows a gap-limiting component wall made with a guiding element and a guiding lip in
 a) a cross-sectional view
 b) a side view

The vortex flow may be given an additional velocity component in the peripheral direction by means of guiding elements arranged so as to be inclined or curved in the radial direction, these guiding elements being realized as a guiding web in the simplest embodiment. In FIGS. 4a and 4b, such a guiding web 160, to complement the embodiment of the invention shown in FIG. 3, is fastened to the component side wall of the rotating component 121. Depending on the transition of the guiding element 160 to the guiding lip 150, a velocity vector in the peripheral direction is imposed on the vortex flow. Smaller angles at the transition of the guiding element to the guiding lip lead to a higher velocity component in the peripheral direction. The course of the edge jutting out into the gap has an angle of incidence 161 relative to the gap center plane in the radial direction 180. In this way, according to FIG. 3, the offset 129, occurring in this embodiment of the chamber 126, of the center plane of the gap relative to the center plane of the chamber and the contour of the guiding lip 150 is primarily taken into account.

Figure 5:
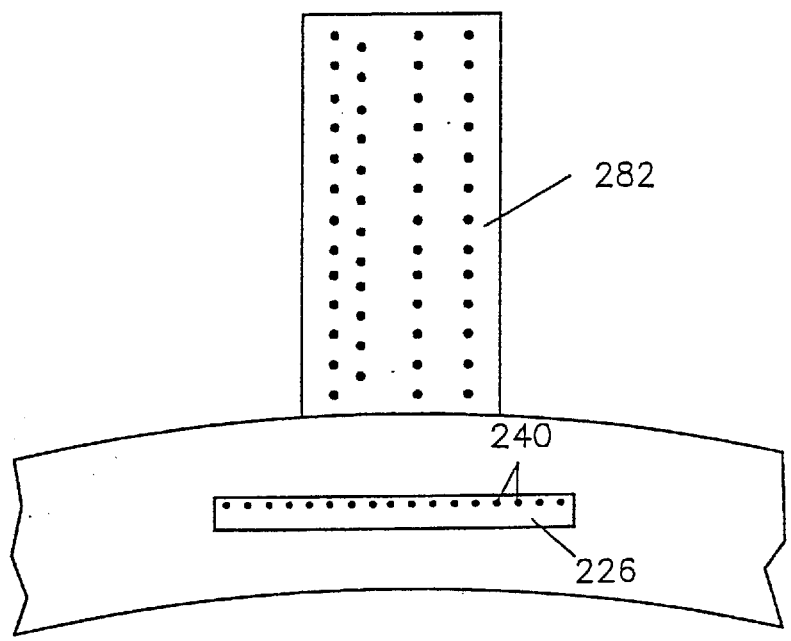
FIG. 5 shows a configuration of a local chamber in the disk of a turbine rotor

The chamber guiding the vortex flow may be formed along the entire length of the run of the gap. Consequently, for the sealing, an endless gap running at the periphery of a component configuration also has an endless chamber. In the case of a finite gap, the chamber may also extend beyond the extent of the gap. Likewise, however, a chamber may also be arranged as a local chamber in a gap. In this case, the local chamber extends only over a section of the gap. In FIG. 5, such a local chamber 226 is shown in a section through a component gap between a combustion chamber and a turbine inlet guide disk of a gas turbine. The local chamber 226 is arranged approximately symmetrically relative to the vane center in front of a turbine guide vane 282 in the longitudinal direction of the gap. The supply conduits 240 of the chamber (one half of which is shown) are depicted here at equal distances from one another at the top margin, facing the primary flow, of the local chamber 226.

Figure 6:
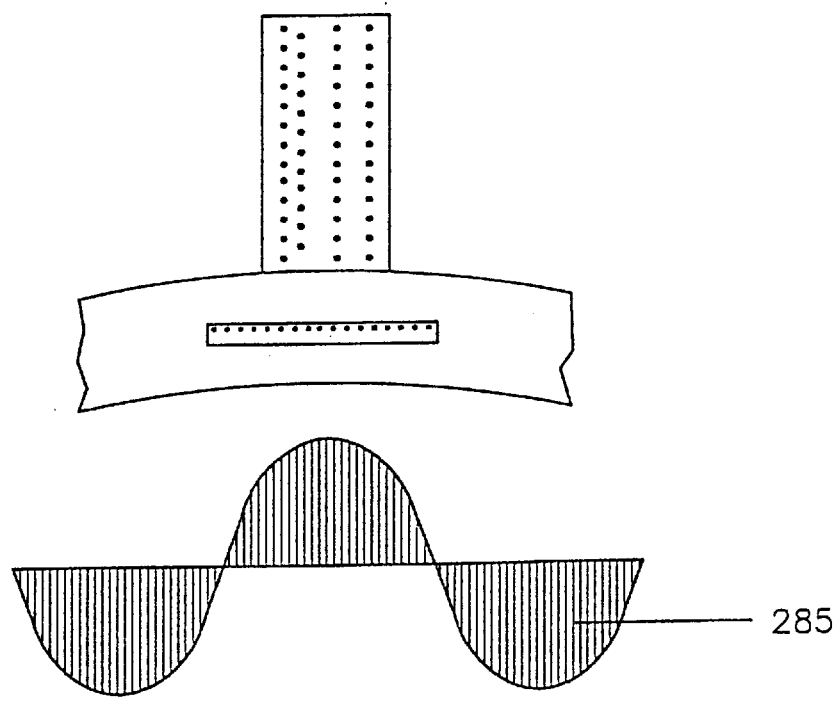
FIG. 6 shows the static pressure distribution of the primary flow in front of a turbine vane and in the adjoining vane passages at the level of the gap

The configuration of one or more local chambers in a gap is appropriate in particular when either the gap is not to be sealed against the primary fluid over its entire length or when the conventional sealing method is to be intensified locally in sections of the gap. This case occurs in particular in the turbine inlet region of a gas turbine. As a result of the local build-up of the primary flow in the incident flow of the vane profile of the inlet guide vanes, in particular at the stagnation point of the vane, with a reaction of this build-up on the inflow, an approximately sinusoidal distribution of the static pressure forms for each vane passage in the plane of the component gap between combustion chamber and turbine. Such a static pressure distribution 285 in front of a turbine guide vane is shown in FIG. 6. In order to eliminate the need for an external compressed-air supply, cooling and sealing fluid in gas turbines is normally extracted from the primary flow in the compressor region. When the pressure loss of the primary flow in the combustion chamber is at the same time only slight, sealing fluid used for the purpose of fluid-dynamic sealing of the component gap between combustion chamber and turbine often has only a slightly higher total pressure compared with the mean static pressure of the primary flow. If a local increase in the static pressure of the primary-fluid flow occurs as a result of a build-up of the primary-fluid flow, the sealing of the gap, in conventional sealing methods, may no longer be adequate in sections of the gap as a result of too low a backpressure of the sealing fluid. In particular in this application, a vortex flow formed in a local chamber leads to functionally reliable sealing of the gap even in the event of small pressure differences.

Figure 7:
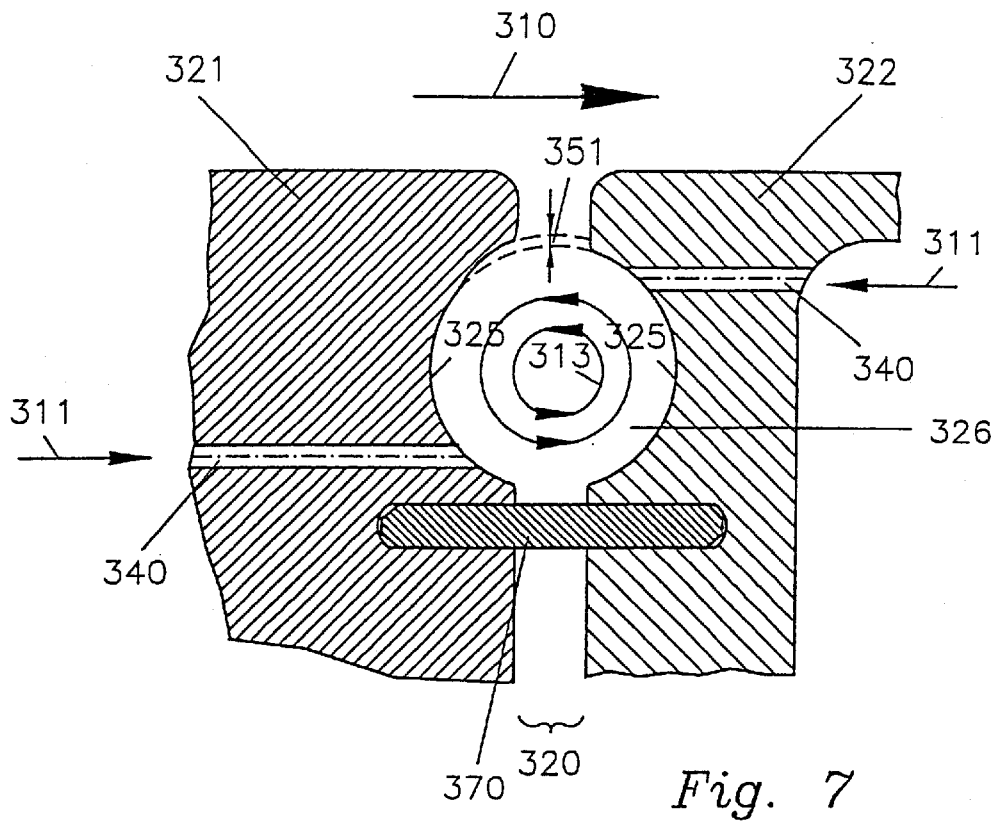
FIG. 7 shows a section through two gap-forming components in a configuration with a further embodiment of the arrangement according to the invention for sealing a gap in combination with a seal strip and an undercut of the chamber contour
Figure 8:
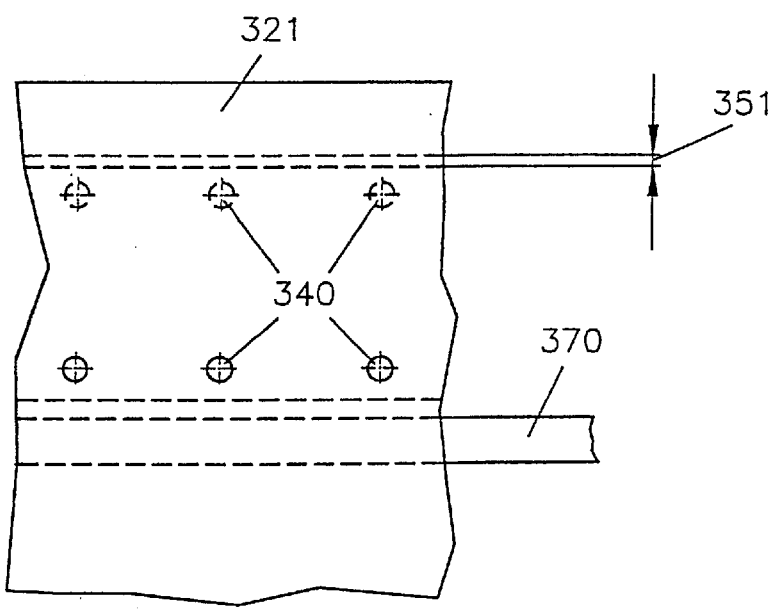
FIG. 8 shows a side view of the embodiment from FIG. 7

FIG. 7 shows an embodiment of the chamber similar to the embodiment shown in FIG. 1. The chamber contour 325 is made in equal halves in both components 321 and 322. In the embodiment shown in FIG. 7, the guiding lips 50 contained in FIG. 1 are omitted. Instead, the chamber in FIG. 7 has an undercut 351 of the components' contours in the region of the gap overspill facing the primary flow. In addition, the edge at the transition of the chamber contour to the gap in the region of the undercut is rounded off, whereas corresponding edges on guiding lips or even in the outlet region of the vortex flow from one chamber half are designed to be sharp as separation edges for the flow. FIG. 8 shows the undercut 351 in a side view of the component 321. The purpose of this undercut 351 is to help fluid of the vortex flow 313 which is discharging from the chamber contour 325 of the component 321 after the gap has overflowed to flow into the chamber contour 325 of the component 321 again, even during a certain divergence of the flow vectors. In addition, largely pulsation-free guidance of the vortex flow 313, even in the event of thermally or mechanically induced, mutual displacement of the components 321 and 322 in the depth direction of the gap, can be ensured by the undercut 351. This tolerance of the chamber contour with regard to displacement of the components relative to one another while avoiding turbulence-point-like misalignments in the flow-guiding wall contour of the chamber is restricted in this case to the dimension of the undercut 351 in the depth direction of the gap. If the undercut 351 is too large, the vortex flow 313 draws in primary fluid 310.

To complement the chamber 326, a mechanical seal is arranged in FIG. 7 on that side of the chamber 326 which is remote from the primary flow 310. This mechanical seal includes a seal strip 370 inserted in grooves.

Figure 9:
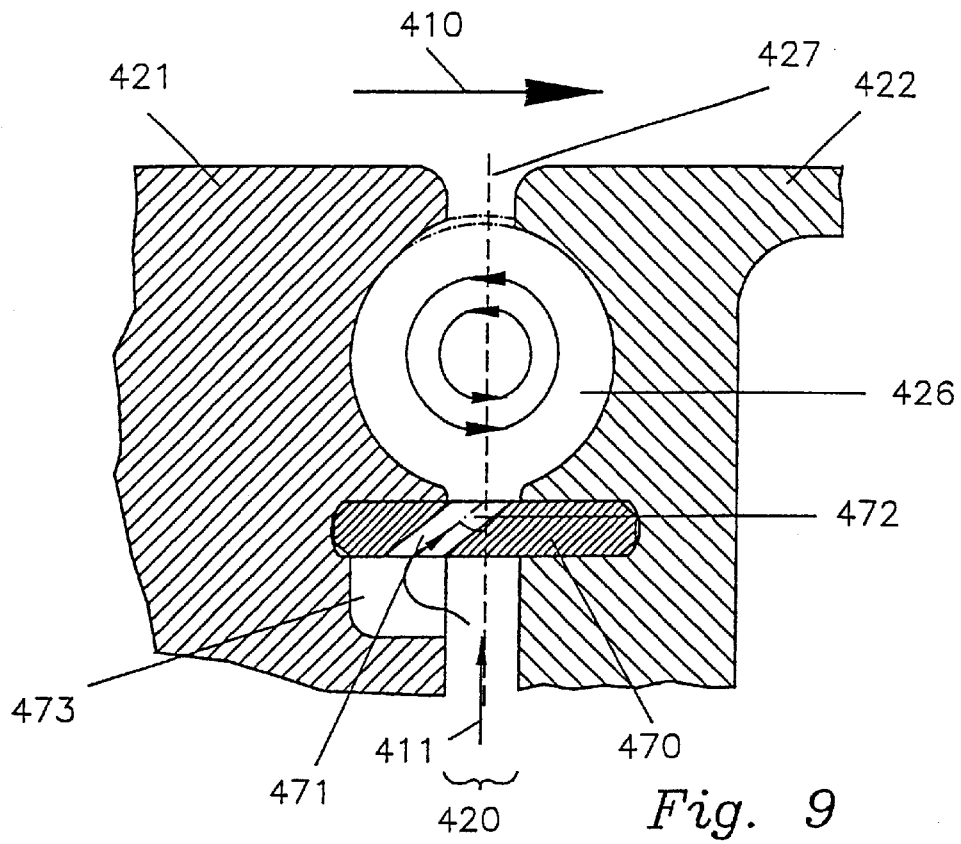
FIG. 9 shows a section through two gap-forming components with a further embodiment of the arrangement according to the invention and a supply of the secondary fluid via openings in the seal strip

In addition, openings 471 are provided in the seal strip 470 shown in FIG. 9. These openings 471 enable the secondary fluid 411 to be supplied to the chamber 426 through the gap 420. In an embodiment which is simplest from the point of view of production, the openings 471 are realized as bores of round cross section which are distributed over the length the seal strip. In further embodiments, they may also be designed with an elliptical or slitlike cross section. In this case, the secondary fluid 411 flows into the chamber 426 at an angle of incidence 472 relative to the gap center plane 427 in accordance with the inclination of the openings 471. In order to ensure a satisfactory inflow of the secondary fluid 411 from the gap 420 into the openings 471 set at an angle of incidence, a supply pocket 473 has been additionally provided in the design shown in FIG. 9.

Figure 10:
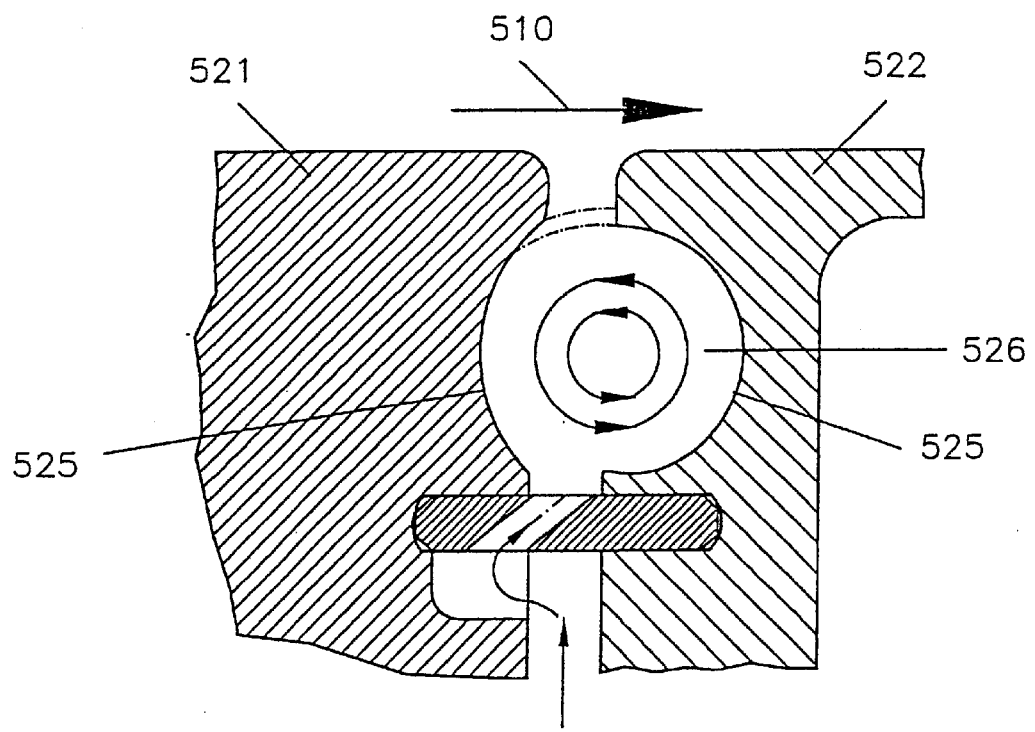
FIG. 10 shows a section through two gap-forming components with a chamber of asymmetrical shape

In principle, the chamber may also be formed from voids which are asymmetrical relative to one another in the contours of the gap-forming component side walls. FIG. 10 shows such a chamber 526 with an asymmetrical component contour. The chamber 126 shown in FIG. 3 likewise has an asymmetrical component contour.

Figure 11:
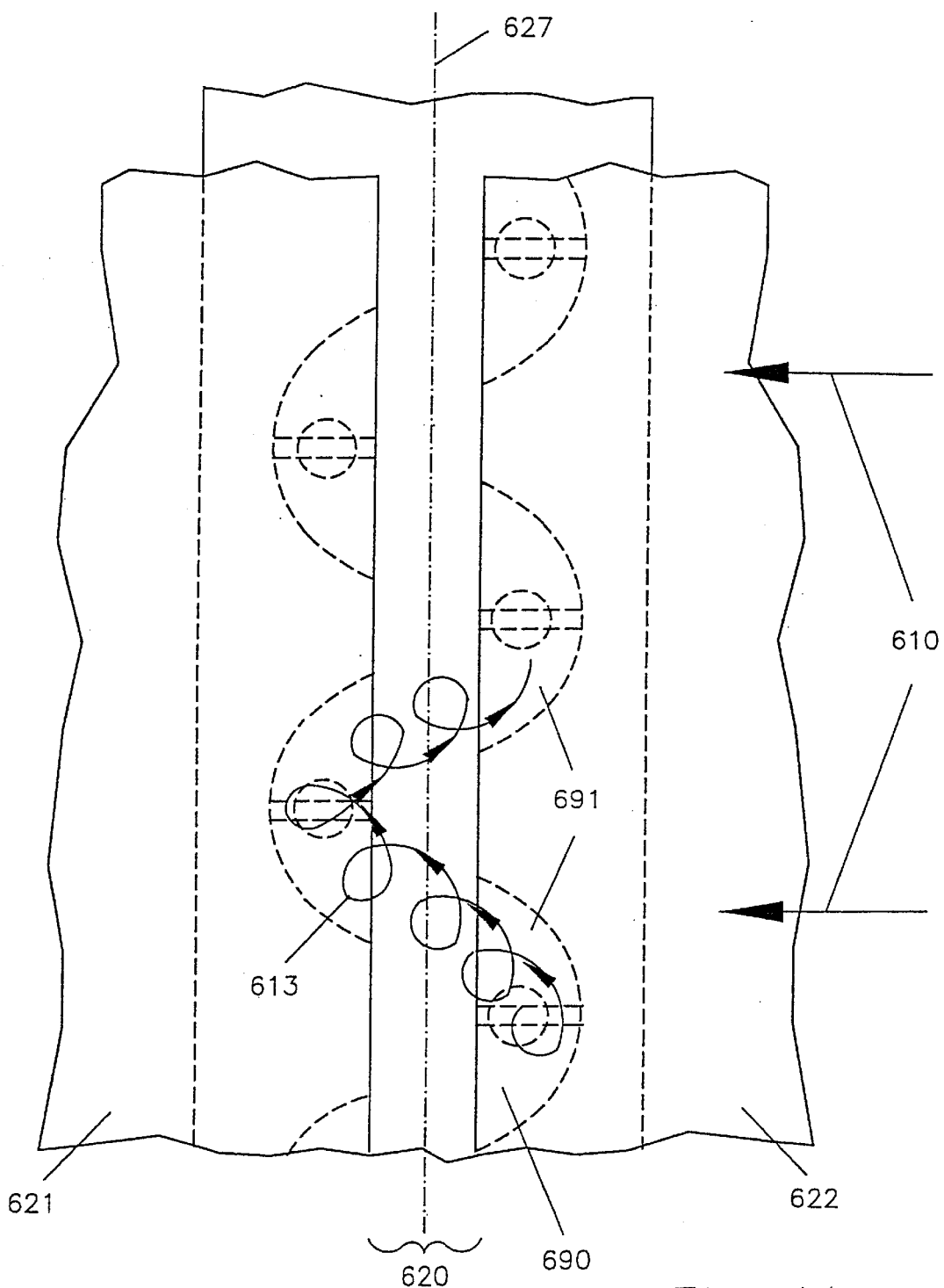
FIG. 11 shows a plan view of a plane gap in a configuration with a slalom conduit
Figure 12:
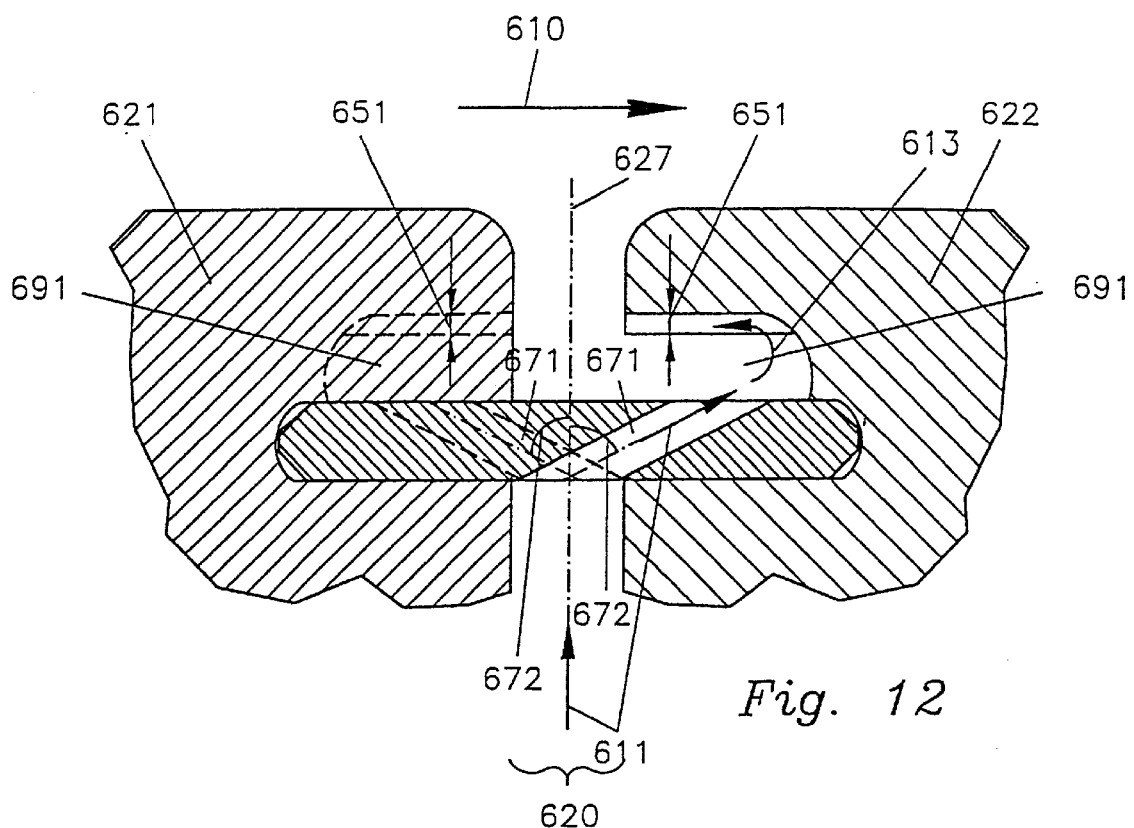
FIG. 12 shows a section through two gap-forming components which have a slalom conduit in combination with a mechanical seal and undercuts of the slalom conduit
Figure 13:
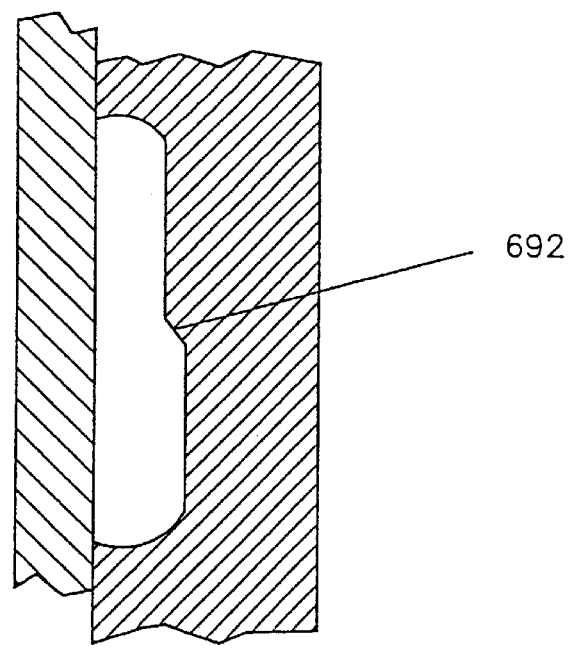
FIG. 13 shows a side view of a deflecting pocket from FIG. 12

FIG. 11 shows a further preferred embodiment. The arrangement according to the invention serves to seal the gap 620 against a primary fluid 610 flowing over the gap. Here, the flow is guided in a chamber which is designed as a slalom conduit 690 and is arranged in S-shaped undulations along the gap 620. The secondary fluid 611 is supplied to the slalom conduit 690 via openings 671 in the seal strip 670 inserted in grooves, as shown in FIG. 12. The openings 671, depending on the respective position with regard to the slalom conduit 690, are set at varying angles of incidence 672 relative to the gap center plane 627. The secondary fluid 611 is preferably supplied to the chamber in the side pockets 691. The smallest indirect mass flow losses of the vortex flow 613 occur here as a result of the direct outflow of the supplied secondary fluid 611 from the gap 620 into the primary flow 610. The flow over the gap 620 on the primary-flow side is again assisted by undercuts 651 of the components. The flow cross sections of the slalom conduit 690, which are enlarged as a result of the undercuts, are reduced again, as shown in FIG. 13, by reductions 692 of the cross section in the side pockets 691 of the slalom conduit 690. This reduction may also be effected in a continuous manner.

The vortex flow 613 guided in the slalom conduit 690 flows over the gap 620 repeatedly while following the S-shaped conduit path. As a function in particular of the angle of incidence 672 of the openings 671 and thus as a function of the supply of the secondary fluid 611 to the slalom conduit 690, a vortex system having a vortex vector in the longitudinal direction of the conduit is superimposed on this S-shaped flow path following the conduit path.

Smaller radii of the S-shaped undulations produce greater pressure losses of the vortex flow 613. At the same time, however, a more homongeneous sealing and cooling effect occurs as a result of the more frequent flow over the gap 620.

Figure 14:
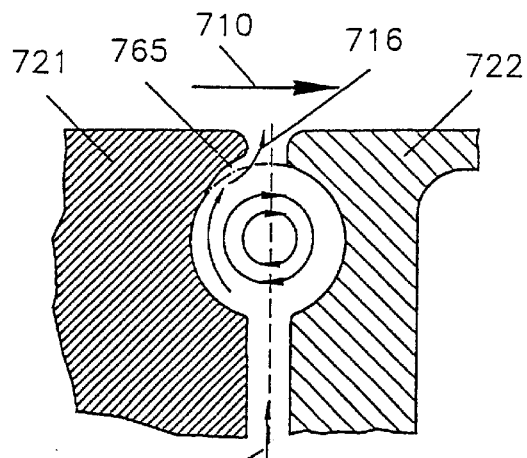
FIG. 14 shows a section through a chamber having a locally exaggerated undercut for paring off the vortex
Figure 15:
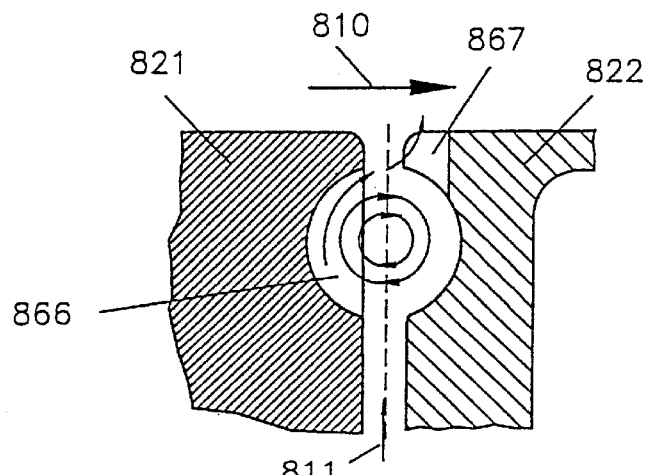
FIG. 15 shows a section through a chamber having a transverse wall and an interruption for paring off the vortex
Figure 16:
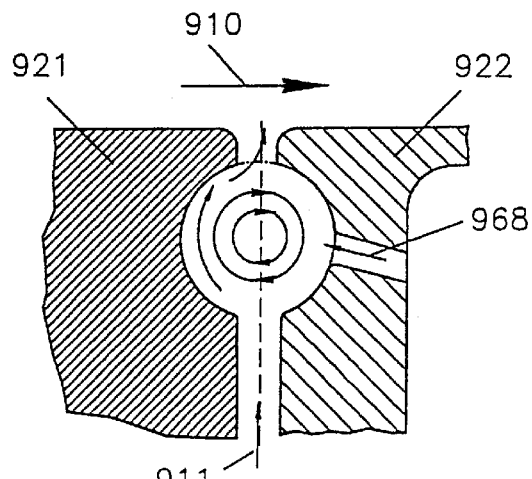
FIG. 16 shows a section through a chamber having a laterally supplied secondary fluid conduit for paring off the vortex.

Shown in FIGS. 14, 15 and 16 are chambers which additionally have vortex diffusers. These vortex diffusers serve to locally perturb the vortex structure and to thus cause an outflow of the fluid of the vortex flow into the primary flow. The vortex diffusers are designed differently in FIGS. 14 to 16. FIG. 14 shows a locally exaggerated undercut 765 of the chamber functioning as a vortex diffuser. The undercut 765 is arranged upstream of the gap overspill of the vortex flow in the direction of rotation of the vortex. Fluid on the outside of the vortex, as a result of the smaller radius of the chamber downstream of the gap overspill, is diffused into the primary flow 710. In FIG. 15, a transverse wall 866 is arranged in the chamber in the first gap-forming component as a vortex diffuser. The transverse wall 866 prevents progression of the flow in the longitudinal direction of the chamber. As a result, provided the vortex flow has a velocity component in the longitudinal direction of the gap, a local build-up of the vortex flow occurs inside the chamber. This leads to a local outflow of the fluid of the vortex flow from the chamber into the primary flow 810. This outflow is assisted by a void 867 in the second gap-forming component. This void 867 is arranged between the chamber and the flow of the primary fluid 810 and therefore leads to a local enlargement of the gap. The void 867 or the transverse wall 866 may in each case also be made on its own. FIG. 16 shows an arrangement of a further supply conduit. The secondary fluid 968 supplied in the further, only locally arranged supply conduit leads locally to an aerodynamic disturbance of the vortex flow. As a result of this disturbance of the vortex flow, an outflow of fluid of the vortex flow into the primary flow 910 likewise occurs.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An arrangement for sealing a gap against a primary fluid by means of a secondary fluid, comprising:
    a first component;
    a second component, a gap being arranged between the first component and the second component and extending at least in part along a gap longitudinal direction, the first component and the second component being stationary relative to one another;
    a secondary fluid forming a vortex flow in at least one section along the gap at a location selected from the group consisting of in the gap and a location directly adjacent to the gap.

2. The arrangement as claimed in claim 1, further comprising a chamber arranged in the gap in the longitudinal direction of the gap.

3. The arrangement as claimed in claim 1, wherein the chamber has a cross sectional shape selected from the group consisting of a circular cross section and an elliptical cross section.

4. The arrangement as claimed in claim 1, further comprising supply conduits which lead into a structure selected from the group consisting of the gap, the chamber, and both.

5. The arrangement as claimed in claim 4, wherein the vortex flow includes marginal regions, and wherein the supply conduits lead into the structure in the marginal regions of the vortex flow with an injection direction which is tangential relative to the vortex flow.

6. The arrangement as claimed in claim 4, wherein the supply conduits, as seen two-dimensionally in the plan view of the gap, lead into the gap or the chamber at an angle of incidence relative to the chamber or to the longitudinal axis of the gap.

7. The arrangement as claimed in claim 4, wherein at least one of the supply conduits is arranged in precisely that cross-sectional plane of the gap in which the primary-fluid flow has the highest static pressure.

8. The arrangement as claimed in claim 1, wherein said gap includes a depth direction perpendicular to said longitudinal direction, and further comprising guiding elements arranged in the gap or in the chamber, said guiding elements including guiding webs inclined or curved in the depth direction of the gap.

9. An arrangement for sealing a gap against a primary fluid by means of a secondary fluid, comprising:
    a first component;
    a second component, a gap being arranged between the first component and the second component and extending at least in part along a gap longitudinal direction, the first component and the second component being stationary relative to one another;
    a chamber designed as a slalom conduit arranged in the gap in the longitudinal direction of the gap.

10. The arrangement as claimed in claim 9, wherein the chamber comprises at least one guiding lip jutting out into the gap.

11. The arrangement as claimed in claim 9, wherein the chamber comprises at least one undercut.

12. The arrangement as claimed in claim 9, wherein the chamber comprises an endless chamber.

13. The arrangement as claimed in claim 9, wherein the chamber is a local chamber.

14. The arrangement as claimed in claim 9, further comprising dividing walls, and wherein the chamber is subdivided into subchambers by the dividing walls.

15. The arrangement as claimed in claim 9, further comprising a seal strip, and wherein the gap is mechanically sealed by the seal strip.

16. The arrangement as claimed in claim 9, wherein the gap has a gap center plane, and wherein the seal strip comprises openings set at an angle of incidence relative to the gap center plane.

17. The arrangement as claimed in claim 9, wherein the chamber has at least one vortex diffuser.

18. An arrangement for sealing a section of a gap against a primary fluid by means of a secondary fluid, comprising:
    a first component;
    a second component, a gap being arranged between the first component and the second component and extending at least in part along a gap longitudinal direction, the gap having a gap length along the gap longitudinal direction; and a local chamber having a length less than the gap length configured and arranged in the gap in the longitudinal direction of the gap to form a local vortex flow of the secondary fluid when the secondary fluid flows through the gap.

19. The arrangement as claimed in claim 18, wherein the local chamber comprises a rotational chamber having a cross sectional shape selected from the group consisting of a circular cross section and a elliptical cross section.

20. The arrangement as claimed in claim 18, further comprising supply conduits which lead into a structure selected from the group consisting of the gap, the local chamber, and both.

21. The arrangement as claimed in claim 20, wherein the vortex flow includes marginal regions, and wherein the supply conduits lead into the structure in the marginal regions of the vortex flow with an injection direction which is tangential relative to the vortex flow.

22. The arrangement as claimed in claim 20, wherein the supply conduits, as seen two-dimensionally in the plan view of the gap, lead into the gap or the local chamber at an angle of incidence relative to the local chamber or to the longitudinal axis of the gap.

23. The arrangement as claimed in claim 20, wherein at least one of the supply conduits is arranged in precisely that cross-sectional plane of the gap in which the primary-fluid flow has the highest static pressure.

24. The arrangement as claimed in claim 18, wherein said gap includes a depth direction perpendicular to said longitudinal direction, and further comprising guiding elements arranged in the gap or in the local chamber, said guiding element including guiding webs inclined or curved in the depth direction of the gap.

25. The arrangement as claimed in claim 18, wherein the local chamber comprises at least one guiding lip jutting out into the gap.

26. The arrangement as claimed in claim 18, wherein the local chamber comprises at least one undercut.

27. The arrangement as claimed in claim 18, further comprising dividing walls, and wherein the local chamber is subdivided into subchambers by the dividing walls.

28. The arrangement as claimed in claim 18, further comprising a seal strip, and wherein the gap is mechanically sealed by the seal strip.

29. The arrangement as claimed in claim 28, wherein the gap has a gap center plane, and wherein the seal strip comprises openings set at an angle of incidence relative to the gap center plane.

30. The arrangement as claimed in claim 18, wherein the local chamber has at least one vortex diffuser.

31. An arrangement for sealing a gap against a primary fluid by means of a secondary fluid, comprising;

a first component;

a second component, a gap being arranged between the first component and the second component and extending at least in part along a gap longitudinal direction, the gap including a chamber, the first component and the second component being stationary relative to one another;

a secondary fluid including a vortex flow, the secondary fluid flowing into an element selected from the group consisting of the gap, the chamber, and the immediate vicinity of the gap.

32. The arrangement as claimed in claim 31, wherein cooling of the components adjacent to the vortex flow is achieved by the vortex flow.

* * * * *